Oct. 13, 1964  J. HILL  3,152,428
LOADING MECHANISM
Filed June 26, 1961  5 Sheets-Sheet 1

AIR SUPPLY

INVENTOR.
JOHN HILL
BY
Eber J. Hyde
ATTORNEY

Oct. 13, 1964 J. HILL 3,152,428
LOADING MECHANISM
Filed June 26, 1961 5 Sheets-Sheet 3

INVENTOR.
JOHN HILL
BY
Eber J. Hyde
ATTORNEY

Oct. 13, 1964  J. HILL  3,152,428
LOADING MECHANISM
Filed June 26, 1961  5 Sheets-Sheet 4
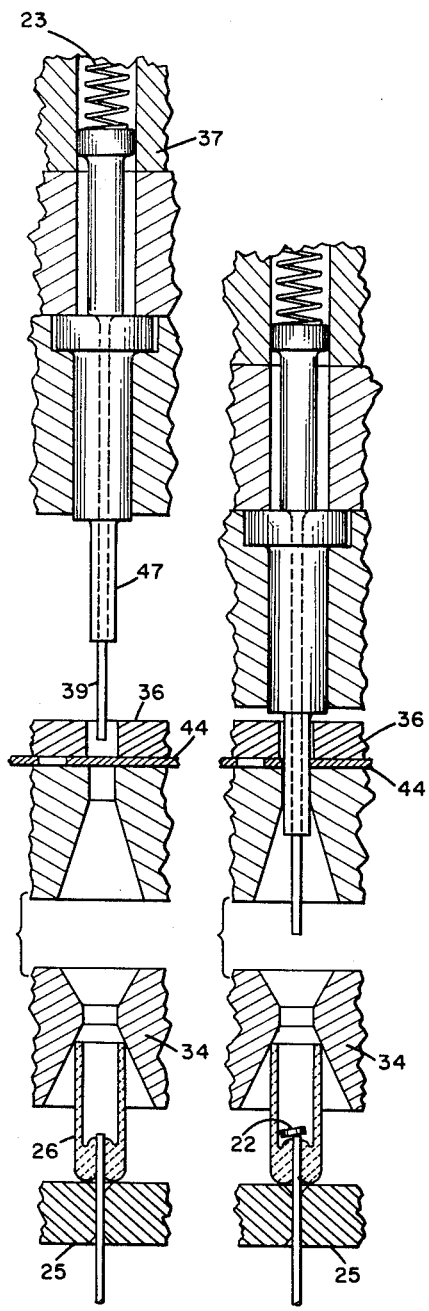
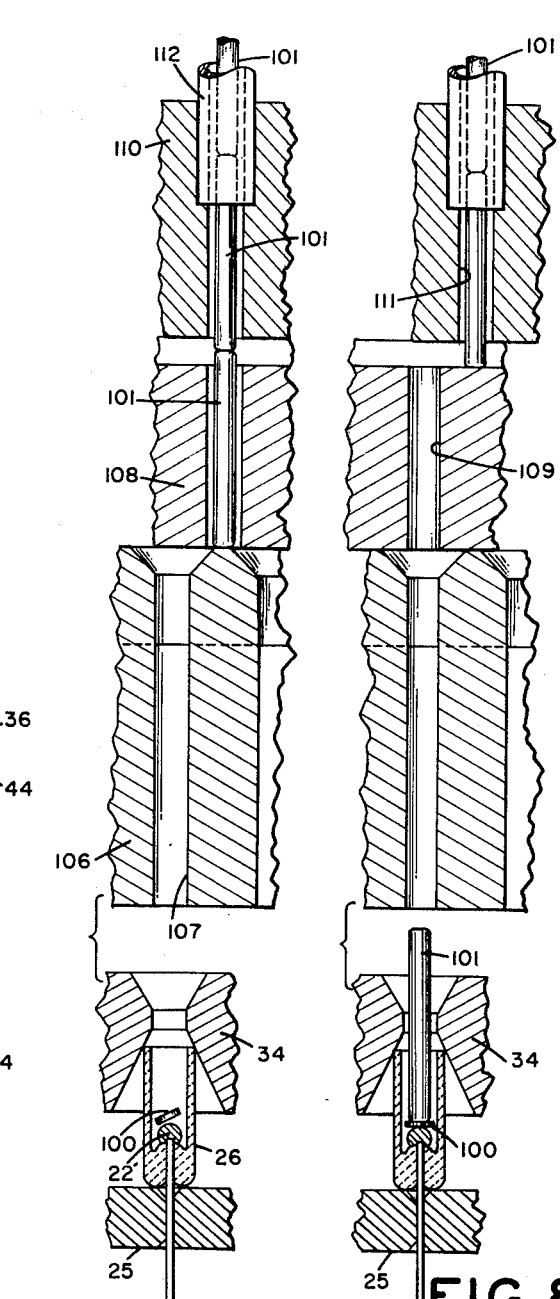
FIG.4  FIG.5  FIG.7  FIG.8
INVENTOR.
JOHN HILL
BY
*Eber J. Hyde*
ATTORNEY Oct. 13, 1964  J. HILL  3,152,428
LOADING MECHANISM
Filed June 26, 1961  5 Sheets-Sheet 5

INVENTOR.
JOHN HILL
BY
Eber J. Hyde
ATTORNEY

United States Patent Office 3,152,428
Patented Oct. 13, 1964

3,152,428
LOADING MECHANISM
John Hill, Wakefield, Mass., assignor to Clevite Corporation, a corporation of Ohio
Filed June 26, 1961, Ser. No. 119,668
10 Claims. (Cl. 53—59)

This invention pertains to a loading mechanism and more particularly to a mechanism for loading small devices into or on a large number of loading areas.

The device of the present invention is particularly adapted to load either small pellets of solder or very small weights into partially assembled diode cups during the manufacture of the diode.

While the device of this invention was specifically designed to stamp out and load very small solder pellets and to place into each partially assembled diode cup a small weight which is used in the process of manufacturing the diode, it will be obvious to those skilled in the art that the machine of this invention may be readily adapted to other loading problems.

At one point in the process of manufacturing diodes there is provided a small open-ended glass cup with a wire soldered through the bottom of the cup. A subsequent step in the process requires that a very small pellet of solder be placed in the bottom of the cup. This solder pellet is then melted to form an electrical contact with the wire extending through the bottom and thereafter a very small chip of a semiconductive material is placed on the solder. In order to assure that the semiconductive device is properly placed in the cup and is held in immediate contact with the solder during a subsequent manufacturing step, a long slender stainless steel weight or pin is inserted into the cup to hold the semiconductive chip in place.

Efficient production and low cost of the diode require that many hundreds of thousands of these little diodes be manufactured every day. In the past it has been a time-consuming and expensive operation to insert into thousands of open cups the little pellets, the semiconductive devices, and the stainless steel pins.

It is an object of the present invention to provide a machine for quickly and efficiently loading a tremendous number of devices such as solder pellets or weights into a large number of small loading areas, particularly where the loading areas move past a loading station at a substantially constant speed and the loading action takes place as a succession of spaced intermittent loading operations.

Another object of the present invention is to provide a loading device wherein a large number of items can be loaded into very small receptacles with a high degree of accuracy so that none of the devices to be loaded miss the device into which it is to be loaded.

Another object of the present invention is to provide a highly accurate intermittent mechanism for accurately loading devices into very small continuously moving parts.

For a better understanding of the present invention, together with other and further objects thereof, reference is had to the following description taken in connection with the accompanying drawings, and its scope will be pointed out in the appended claims.

An aspect of the present invention lies in the provision of a loading mechanism wherein a device which has a large plurality of areas to be loaded moves past a loading station with a uniform velocity during a succession of timed intermittent loading operations. In order to obtain the accuracy desired a photo cell is located adjacent the path of movement of the device and the photo cell has a light beam which is periodically interrupted by portions of the device as the device moves past the photo cell. Means are provided for loading the areas of the moving device. The loading means are actuated under the control of the photo cell to cause the loading means intermittently to place the items on the loading areas of the moving device at the proper time dependent upon the velocity of the movement of the device and upon the interruption of the photo cell light beam.

With reference to the drawings, there is shown in FIGURE 1 a schematic diagram showing the loading mechanism, the hydraulic and pneumatic circuits actuating the mechanism and the electric circuit for controlling the entire device;

FIGURES 4 and 5 show successive steps in the punching operation and show a solder pellet loading into a small diode cup;

FIGURES 7 and 8 are views similar to FIGURES 4 and 5 but showing the successive steps in the weight loading process.

Figure 1:
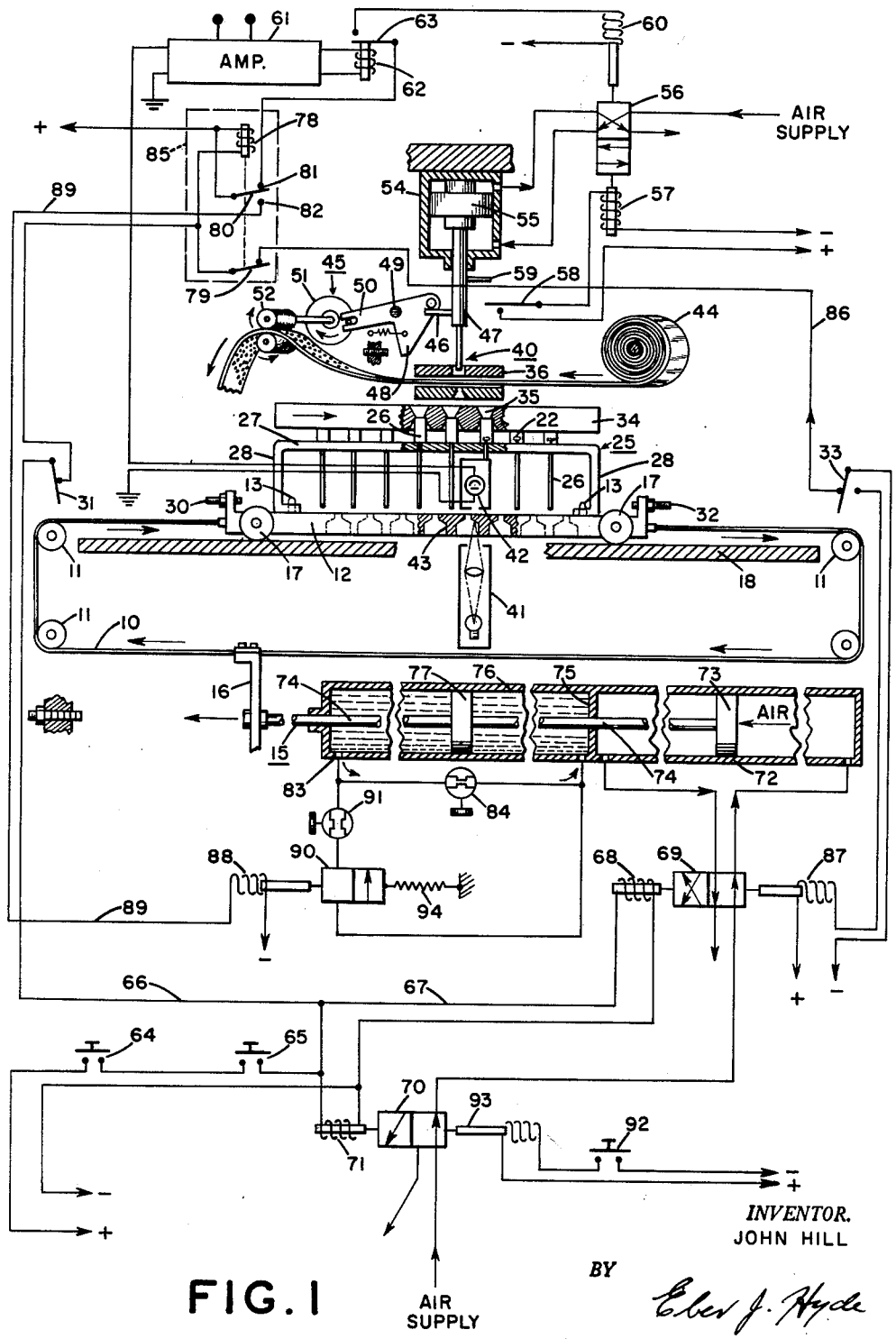

Referring to FIGURE 1, the loading mechanism comprises a belt 10 mounted around four rollers 11 and one end of which is connected to one end of a movable carriage 12 and the other end of which is connected to the opposite end of the carirage 12. A reciprocating mechanism indicated generally by the reference character 15 is connected through arm 16 to the movable belt 10 to cause reciprocating movement of the belt 10 and consequently of the carriage 12. The carriage 12 is mounted on four rollers 17 which run on the plate 18. A rail 19 (FIGS. 2, 3) is mounted on the plate 18 and serves to restrict the carriage to a perfectly straight linear motion. Three carriage rollers 20 are mounted on the underneath side of the carriage 12 and engage on opposite sides of the rail 19 to cooperate with the rail in assuring that the movement of the carriage is perfectly straight. The reciprocating mechanism 15, in a manner to be more fully explained, intermittently causes the carriage 12 to move from left to right at a given rate of speed, to a point where it reaches a limit stop, and then moves the carriage back to its starting point at a rapid rate. A boat 25 is carried by the carriage mechanism during each of these cycles. The boat 25 has mounted in it several hundred little open-ended diode cups 26, each of which is to receive a solder pellet 22 in the upwardly facing open cup during the forward movement of the carriage. The boat 25 is comprised of a frame member 27 having downwardly extending legs 28 which turn inwardly and rest on the surface of the carriage 12. The carriage 12 has two accurately located pins 13 extending upwardly from its top surface. The boat 25 has two locating holes 29 (FIG. 3) extending through its legs 28 and into which the pins 13 extend to accurately position the boat 25 in respect to the carriage 12. During an assembly operation or cycle the carriage 12 starts at the left hand side with a limit stop 30 holding open the switch 31. The carriage is at rest. The operator picks up a boat 25 which previously has been loaded with several hundred of the little diode cups retained in such a manner that the glass portion rests on the frame 27 and the wires which extend from the bottom of the cup project through holes in the frame 27. The operator places the loaded boat 25 on the pins 13 so that the boat is in a fixed accurately located position relative to the carriage 12. The carriage and its boat are then caused to move to the right and during this movement a loading mechanism is caused to intermittently load the successive diode cups as each passes a loading station until the limit stop 32 opens a limit switch 33, at which time the carriage 12 quickly returns the loaded boat to the starting position where it stops, permitting the operator to remove the loaded boat 25 and substitute therefor another boat to be loaded. To facilitate the accuracy of loading, a header device 34 is placed on top of the diode cups. The header device consists of a plate having holes drilled through it for each of the diodes, the holes 35 being in the form of small funnels which aid in accurately depositing the small solder pellets into the diode cups.

Figure 2:
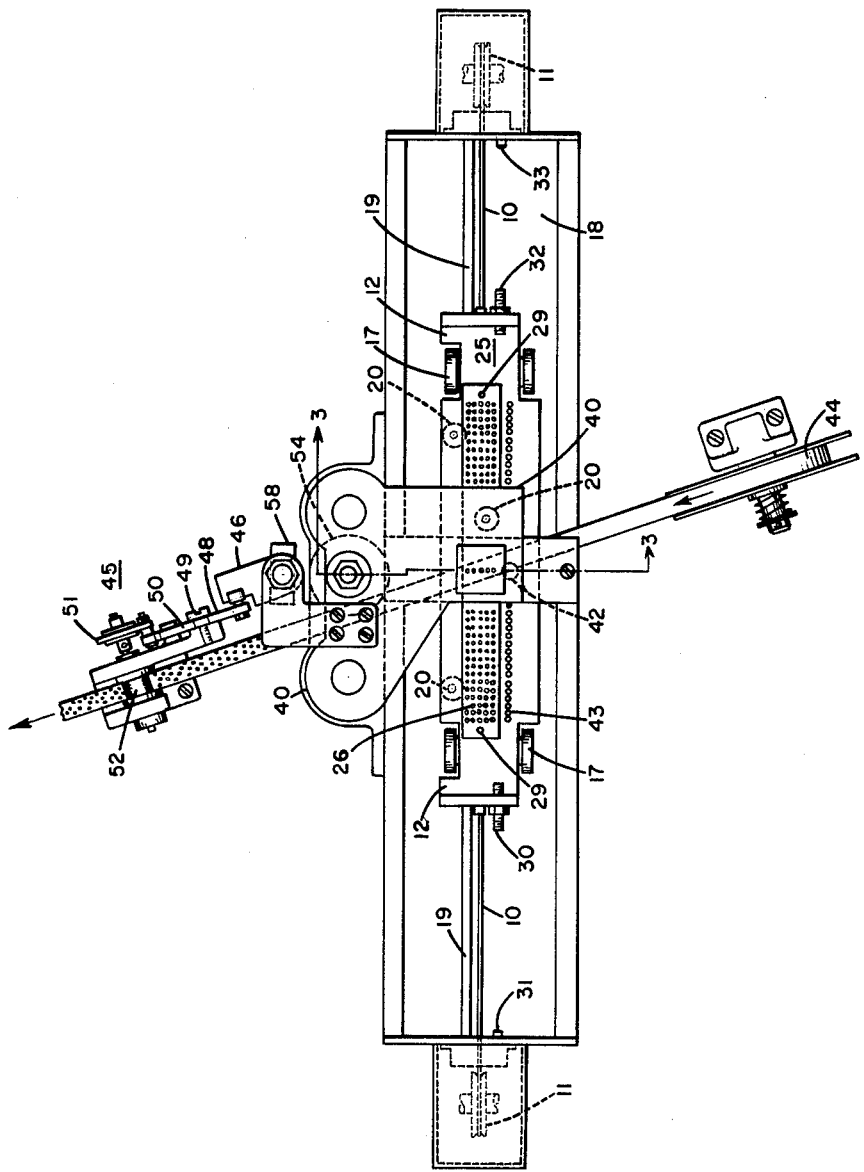
FIGURE 2 is a top view of the mechanism, shown particularly for punching small solder pellets from a long strip of solder and loading them into diode cups.
Figure 3:
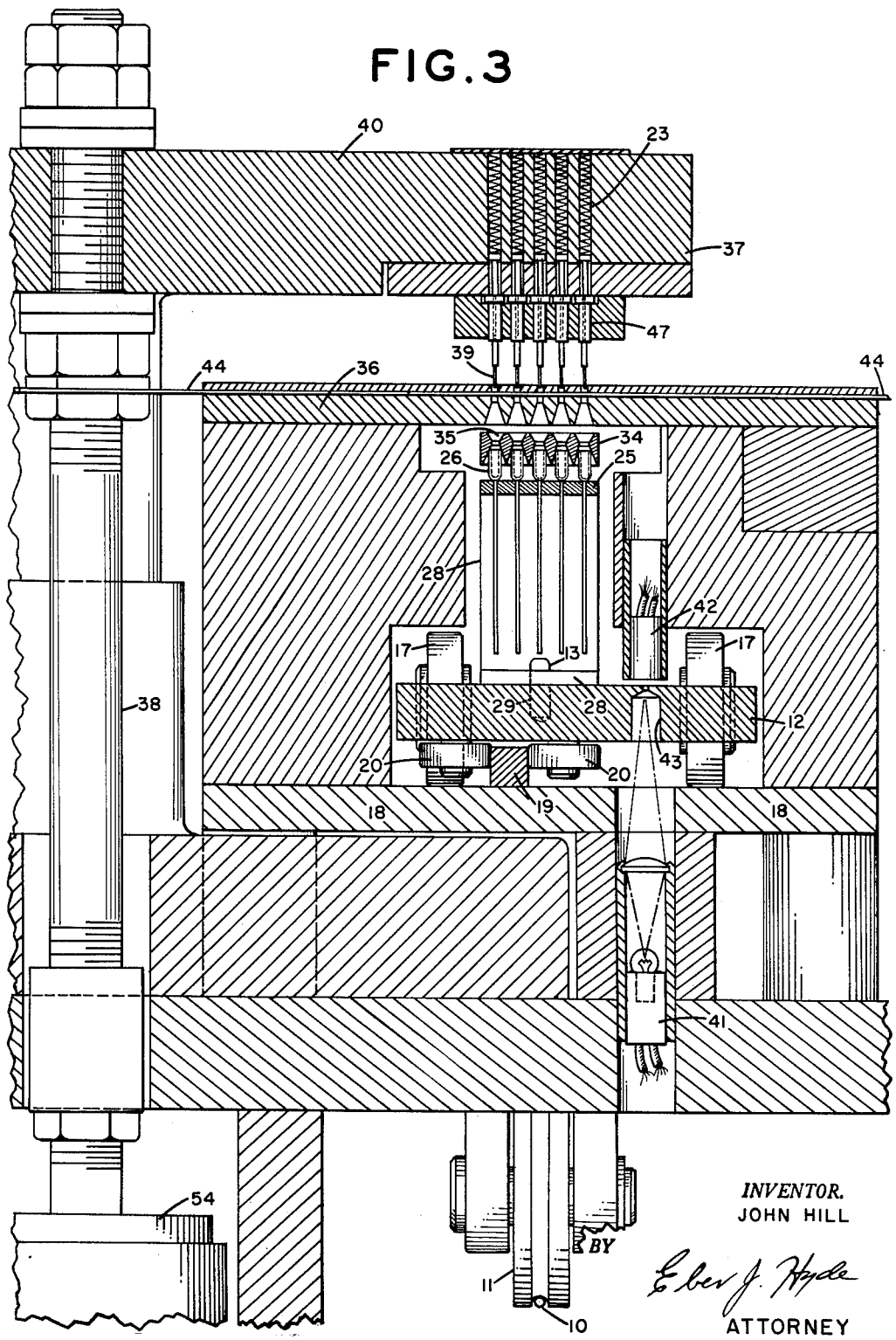
FIGURE 3 is a sectional view taken along line 3—3 of FIGURE 2.

In order to establish an intermittent loading action which is very accurately timed with the passage of the diode cups past a loading station such as the solder punch 40, a photo cell device 41, 42 is employed. The light portion 41 of the photo cell is mounted in a stationary portion of the plate 18 below the carriage 12. The cell portion 42 is mounted in a stationary portion of the device at a location directly above the light 41 and on the opposite side of the carriage 12, as is clearly shown in FIGURE 3. The carriage 12 has through it a large number of timing holes 43. One of these holes 43 is aligned with each horizontal row of diode cups 26, as shown by FIGURE 2. The light from the photo cell will project through a given timing hole 43 and will be received by the cell portion 42 at the instant that a row of the diode cups 26 is in position under the solder punches 40. The solder punches are caused to punch solder pellets out of a strip of solder 44 and load the pellets into the diode cups which are at that instant immediately below the solder punches.

In the device shown there are five diode cups aligned in each horizontal row and consequently there are five punches aligned in a horizontal row for simultaneously punching out the five solder pellets and loading them into the five diode cups which are at that instant directly beneath the punches. The strip of solder 44 is fed beneath the punches 40 and is actuated by a mechanism 45. The actuating mechanism for the solder strip causes the solder strip to move only on the up stroke of the punches. Consequently the solder strip is stationary during a punching operation and upon the withdrawal of the punches the solder strip is moved forward a very slight amount so that the next punching operation is performed upon unperforated solder material. The actuating mechanism 45 is controlled by a pin 46 mounted upon the shaft 47 of the punch. On the up stroke of the shaft 47 the pin 46 engages a pivot plate 48 which is pivoted at 49 and has an arm 50 in engagement with a pin mounted on a wheel 51.

Movement of the pivot plate 48 causes the wheel 51 to rotate thereby rotating the knurled pressure wheels 52 between which the perforated end of the solder strip 44 passes.

As previously mentioned, the timing of the punching mechanism is derived from the photo cell unit. The punch is actuated by an air cylinder 54 within which there is a piston 55. The piston 55 is connected to the shaft 47 of the punches. Air is admitted to the upper part of the cylinder and is exhausted through the valve 56. A solenoid 57 helps to control the position of the valve 56 and is energized when switch 58 is closed by the arm 59 mounted on the shaft 47 of the punch. A solenoid 60 also helps to control the valve 56 and operates in opposition to the solenoid 57. The output of the cell 42 is applied to the amplifier 61 and the output of the amplifier 61 is applied to the solenoid 62 which operates switch 63.

After an operator has placed a loaded boat in position on the carriage 12 she simultaneously closes both starter buttons 64 and 65, thereby through line 66 applying power to blade 31 of the open limit switch, and simultaneously through line 67 power is applied to the solenoid 68 of the right-left control valve 69 which receives its air supply from control valve 70. The control valve 70 is controlled by solenoid 71 which is energized simultaneously with solenoid 68 upon closing of the starter buttons 64, 65. The schematic diagram of FIGURE 1 shows the solenoids and the valves in a position such that the air supply passes through control valve 70, passes through the right-left control valve 69 to the right-hand end of an air cylinder 72. Piston 73 in the air cylinder 72 is forced to the left and air to the left-hand side of the piston exhausts through the right-left control valve 69 to atmosphere. Shaft 74 on the piston extends through a sealed wall 75 through the oil-filled hydraulic cylinder 76 to the piston 77 through the piston 77 to a location external of the oil cylinder 76, where it connects to the actuating arm 16 causing the belt 10 to move and causing the carriage 12 to move to the right. Movement of the carriage 12 to the right causes the energized switch 31 to close. When switch 31 closes it energizes solenoid 78 in a timer device 85, thereby closing switch 79 and after a time delay closing the blade of switch 80 on the upper contact 81, thereby opening the blade 80 from lower contact 82. Upon the closing of switch 80 upon contact 81, line power is applied to the blade 63 which is operated by solenoid 62. As solenoid 62 closes the switch 63, upon receiving a signal from the photo cell 41, 42, power is applied to the solenoid 60 which operates the valve 56 supplying air to cause a downward stroke of the punch mechanism 40. Thus the carriage 12 must be moving to the right before the punch will operate and the punch will operate only when a light beam from the light 41 strikes the cell 42 which controls amplifier 61. Each time a small timing hole 43 through the deck of the moving carriage 12 passes between the light source 41 and the cell 42 the battery of five punches will operate. When the piston 55 of the punch descends, five little solder pellets will be punched out of the tape 44 and deposited in five little diode cups. Also, arm 59 closes the switch 58, thereby energizing solenoid 57 and causing the valve 56 to reverse the supply of air to the air cylinder 54 causing the piston 55 to be retracted and upon the retracting movement, as has been explained, the solder advancing mechanism 45 will operate to pull a new section of the strip of solder 44 underneath the punches.

As is shown particularly in FIGURE 2, the solder strip 44 traverses across the carriage 12 at an angle of approximately 70° to the direction of motion of the carriage. This angular relationship assures efficient use of the solder strip without crowding the five punches in the very small width of the strip of solder.

Smooth movement of the carriage 12 is assured by the use of the oil-filled cylinder 76 and the piston 77. As the piston 77 is moved to the left by the air cylinder and piston 73, oil flows out of the outlet 83 through the small adjustable control valve 84 back into the right-hand side of the cylinder 76. Valve 84 restricts the flow of oil and controls the rate of motion of the carriage 12 as the carriage moves to the right.

Limit switch 33, in its normal position shown in FIGURE 1, forms a holding circuit for the relay coil 78 of the timer switch 85. When the adjustable stop 32 on the carriage 12 opens the limit switch 33, the coil 78 is de-energized and its blade 80 instantly opens contact 81 and closes with contact 82, thereby preventing the amplifier output relay 62, 63 from operating during the return of the carriage 12. This prevents the punch from operating during the return of the carriage. Switch 79 also opens to prevent the timer 85 from being re-energized during the return of the carriage.

Also, when the limit stop 32 opens switch 33 it establishes a circuit through the solenoid 87 which help to operate right-left control valve 69, reversing the flow of air from the air supply into the air cylinder 72, thereby forcing piston 73 to the right and starting the carriage 12 on its return to its left-hand position. Simultaneously with the energization of solenoid 87, solenoid 78 closes switch blade 80 on contact 82, establishing a power circuit through line 89 to solenoid 88 of the by-pass valve 90, thereby opening a large hydraulic circuit through adjustable valve 91, permitting the carriage to return very quickly to its starting position where it opens limit switch 31, causing the carriage to come to a stop.

At this instant the operator removes the boat 25 and substitutes a new boat and she then simultaneously closes both starter buttons 64, 65 starting the sequence of operations.

As the boat begins to move to the right, switch 31 closes, starting the sequence which was previously described. At this instant, as was explained, the by-pass valve 90 is still open, permitting a large flow of oil through the valve, with consequent fast movement of the carriage. This fast movement is now in the forward direction, and continues for a few seconds until the delay switch 85 allows switch blade 81 to open from contact 82 and close on contact 81. Opening of contact 82 deenergizes solenoid 88 and spring 94 closes valve 90 slowing the motion of the carriage to that permitted by control valve 84. Slowing of the carriage motion takes place just before the first line of diodes reaches the photo cell 41, 42.

An emergency stop button 92 controls a solenoid 93 which operates an air supply valve 70 to stop the motion of the carriage 12 instantaneously should an emergency arise.

The solder material 44 is led through a die plate 36 located directly under the battery of five punches 47. Each of the five punches is mounted on plate 37 which is actuated by the pneumatic cylinder 54 (FIGURE 3), through shaft 38. Each punch 47 comprises an ejector 39 biased by a spring 23 and a punch section of large diameter which cooperates with the die plate to shear the solder strip 44 forming a pellet 22 which the ejector pushes into the diode cup. The spring 23 permits the ejector section to telescope back into the punch section when the ejector engages the solder strip, then the punch shears the pellet and the spring biased ejector pushes the pellet through the die plate 36, through the header 34 into the diode cup.

Figure 6:
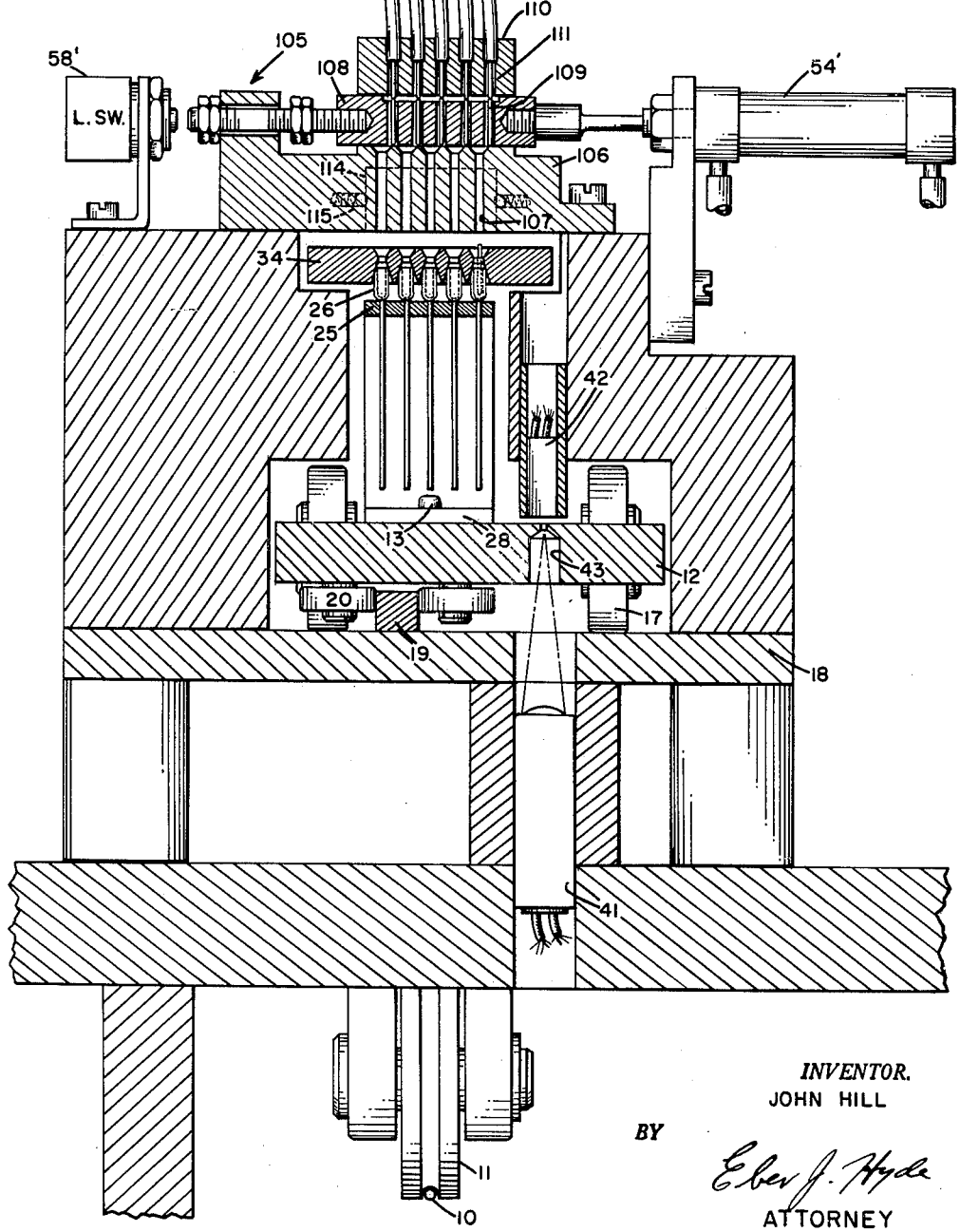
FIGURE 6 is a sectional view similar to that shown in FIGURE 3 but modified to show a device for loading weights into the diode cups.

FIGURES 6, 7, and 8 illustrate the mechanism of the present invention applied to a weight loading device.

After the solder pellet 22 has been placed in the diode cup 26 it is melted, forming a solder ball 22', and thereafter a wafer 100 of semiconductive material is put on top of the solder ball 22'. A stainless steel weight in the form of a pin 101 next is placed in the cup 26, and as shown, the weight causes the flat wafer 100 to be positioned substantially straight across the cup 26. In this position the diode cup is again heated to cause a melting of the solder 22' and is then cooled, resulting in the wafer 100 being physically and electrically connected to the wire through the diode cup 26. The weight 101 is then removed and the partially assembled diode is ready to undergo further steps in the manufacturing process.

The mechanism shown in FIGURE 6 is used to automatically position five weights at a time in the moving diode cups 26. The only essential difference between the device shown in FIGURE 1 and the device shown in FIGURE 6 lies in the use of a reciprocating escapement mechanism 105 instead of the punch 40, and the escapement mechanism is operated by a pneumatic cylinder 54' and piston arrangement similar to the cylinder 54 and piston 55 of the previous device.

The escapement mechanism 105 comprises a stationary plate 106 mounted above the moving boat 25 with its header 34 and with five holes 107 through it aligned with the path of movement of the five diode cups 26. A reciprocating plate 108 is mounted above the stationary plate 106 and has five holes 109 through it which are spaced apart laterally the same as the five holes 107. The reciprocating plate 108 is moved back and forth by the air cylinder 54' and is controlled by the limit switch 58', similar to the control arrangement used for cylinder 54. Another stationary plate 110 having holes 111 is positioned above reciprocating plate 108 with its holes registered with holes 109 when the reciprocating plate is in one position. Movement of the reciprocating plate causes the holes 109 to be registered first with the holes 111 and then with the holes 107, but at no time are the holes 109 registered simultaneously with both holes 107 and 111. The thickness of the plate 108 is such that it comfortably receives pins 101. As the plate 108 is moved to one position it will receive five pins from tubes 112 (which receive their supply from a vibratory hopper, not shown) and as the plate 108 moves to another position it will deliver the five pins through the stationary plate 106 into the five diode cups which at that instant are directly under the holes 107 in plate 106. Movement of plate 108 back to its starting position again loads the holes 109 with pins ready to be delivered to the next set of five diode cups which pass under the holes 107.

Movement of the boat 25 as shown in FIGURE 6 is into the paper. A knock-out plate 114 is positioned in the far wall of plate 106 and is held in place by spring biased ball detents 115. If a pin 101 should become jammed in the mechanism in such a manner that the moving boat 25 and header 34 are locked to the stationary plate 106, the knock-out plate 114 will be forced out, thereby preventing serious damage to the mechanism.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. In a loading mechanism, a loading station, a device having a plurality of cups each to be loaded with a single item during a succession of intermitten loading operations as said device moves past said loading station comprising: means for moving said device past a loading station with substantially uniform velocity during the succession of intermittent loading operations; photo cell means located adjacent the path of movement of said device having a light beam periodically interrupted by said device as said device moves and including a photo cell on which said beam is focused, loading means including a portion located at said loading station, actuating means for periodically actuating said loading means to cause said loading means intermittently to place said items into the cups of said moving device as said cups reach said loading means, means connecting said photo cell to said actuating means for energizing said actuating means at the proper time dependent upon the velocity of movement of said device and upon the condition of said light beam to cause said loading means to intermittently load said cups with said items.

2. A loading mechanism as set forth in claim 1, further characterized by said means for moving said device comprising means for moving said device from a starting station past said loading station with substantially uniform velocity for a given distance, and means for reversing said device and moving it back to its starting station.

3. A loading mechanism as set forth in claim 2, further characterized by said means for moving said device comprising means for moving said device at a given rate of speed higher than said substantially uniform velocity until the loading operation is about to start, and means for slowing down the device to the substantially uniform velocity.

4. A loading mechanism as set forth in claim 2, further characterized by said means for moving said device back to its starting position moving said device with a velocity greater than the said substantially uniform velocity in the forward direction.

5. A loading mechanism as set forth in claim 2, further characterized by said device having a plurality of small holes through which said photo cell beam passes to the photo cell, portions of said device adjacent said holes interrupting the beam, the locations of said holes being correlated to the locations on the said device of the plurality of cups to accurately determine the placement of the items to be loaded on the device.

6. In a loader mechanism for loading items into partially completed electronic devices having the shape of small cups; comprising a boat carrying a large number of the small cups open-end up and arranged in rows, a header mounted on said boat providing a funnel for each of said small cups, movable carriage means, means replaceably mounting said boat on said carriage means in a fixed positional relationship thereto, said carriage means having first indexing means associated with it in fixed position relative to each of the rows of cups, loading station means for intermittently punching out said items and loading rows of said cups with said items one item in each cup, means for moving said carriage means past said loading station means with substantially uniform velocity during a succession of said intermittent loading operations, second indexing means cooperating with said first indexing means and located adjacent the path of movement of said carriage means, actuating means connected to said loading station means and connected to said indexing means to be intermittently energized thereby to load items into all of the said cups in a given row which has reached a given position relative to said loading station means.

7. A loading mechanism as set forth in claim 6, further characterized by said movable carriage means having a series of holes therethrough, one for each of the rows of cups to be loaded, in a fixed positional relationship thereto, constituting said first indexing means; said second indexing means comprising a photo cell device having a light beam in the path of movement of said carriage where it intermittently shines through said holes.

8. A loading mechanism as set forth in claim 6, for use with a tape of solder extending across the top of said header, further characterized by said loading station means including multiple punch means for punching pellets of solder from said tape in timed relation to the positioning of a row of cups underneath the punch.

9. A loading mechanism as set forth in claim 8, further characterized by said tape extending across the direction of movement of said carriage at an angle of about 70 degrees.

10. A loading mechanism as set forth in claim 9, further characterized by tape advancing means for advancing said tape across the direction of travel of said carriage, said advancing means operating to advance the tape intermittently and at times other than during the punching operation.

References Cited in the file of this patent
UNITED STATES PATENTS

| | | |
|---|---|---|
| 2,053,763 | Brinton | Sept. 8, 1936 |
| 2,707,922 | Ferguson et al. | May 10, 1955 |
| 2,829,477 | Folly | Apr. 8, 1958 |
| 2,914,900 | Smith et al. | Dec. 1, 1959 |
| 2,942,392 | McCain et al. | June 28, 1960 |
| 2,949,034 | Johnson et al. | Aug. 16, 1960 |
| 2,952,106 | Rostron | Sept. 13, 1960 |
| 2,959,903 | Lancaster | Nov. 15, 1960 |
| 2,967,386 | Hill | Jan. 10, 1961 |
| 3,018,594 | Phillips et al. | Jan. 30, 1962 |